United States Patent
Yoshida

(10) Patent No.: US 6,775,035 B1
(45) Date of Patent: Aug. 10, 2004

(54) IMAGE COMMUNICATION APPARATUS AND METHOD OF CONTROLLING SAME

(75) Inventor: Takehiro Yoshida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 717 days.

(21) Appl. No.: 09/641,975

(22) Filed: Aug. 21, 2000

(30) Foreign Application Priority Data

Aug. 24, 1999 (JP) ........................................ 11-237523 U

(51) Int. Cl.⁷ ............................. H04N 1/00; H04N 1/46
(52) U.S. Cl. ........................ 358/539; 358/405; 358/437; 358/434; 379/100.01
(58) Field of Search ................................. 358/405, 437, 358/434, 440, 444, 441; 379/100.01, 100.15, 100.13, 100.17

(56) References Cited

U.S. PATENT DOCUMENTS

| 5,031,179 A | | 7/1991 | Yoshida et al. ............... 371/32 |
| 5,172,246 A | | 12/1992 | Yoshida ....................... 358/406 |
| 5,220,439 A | | 6/1993 | Yoshida ....................... 358/404 |
| 5,247,370 A | * | 9/1993 | Takaoka ....................... 358/440 |
| 5,363,206 A | * | 11/1994 | Fukushima .................. 358/440 |
| 5,438,427 A | | 8/1995 | Yoshida ....................... 358/405 |
| 5,896,204 A | * | 4/1999 | Sato et al. .................... 358/405 |
| 5,949,552 A | | 9/1999 | Yoshida ....................... 358/435 |
| 6,323,962 B1 | * | 11/2001 | Itoh et al. .................... 358/468 |

* cited by examiner

*Primary Examiner*—Edward Coles
*Assistant Examiner*—Jason Sherrill
(74) *Attorney, Agent, or Firm*—Fitzpatrick, Cella, Harper & Scinto

(57) ABSTRACT

It is so arranged that even if a procedure which does not report the number of lines of an image before image information is transmitted gives rise to an error, the occurrence of the same error can be prevented when a message is re-transmitted. To accomplish this, a reading circuit (14) reads a JPEG color image when facsimile transmission of the image is performed in a direct transmit mode. While the image is being stored in a memory (18), the number of lines in the image is counted. If the number of lines counted attains a predetermined number, the image is encoded in accordance with the JPEG standard and then is transmitted. Here the number of lines is transmitted as zero before the image information is transmitted. If an error occurs on the receiving side, the image is re-transmitted. At re-transmission, the counted number of lines is transmitted before the image information.

10 Claims, 5 Drawing Sheets

IMAGE COMMUNICATION APPARATUS AND METHOD OF CONTROLLING SAME

FIELD OF THE INVENTION

This invention relates to an image communication apparatus and, more particularly, to an image communication apparatus capable of communicating color images by facsimile transmission and to a method of controlling this apparatus.

BACKGROUND OF THE INVENTION

In a conventional color-image communication apparatus, the receiving machine uses the $68^{th}$ bit of a facsimile information field (FIF) in a digital identification signal (DIS) to notify the transmitting machine of whether or not it possesses a JPEG encoding function and uses the $69^{th}$ bit of the FIF in the DIS signal to notify the transmitting machine of whether or not it possesses a full-color mode function. On the other hand, the transmitting machine uses the $68^{th}$ bit of the FIF in a digital command signal (DCS) to instruct the receiving machine to perform JPEG encoding communication by the $68^{th}$ bit of the FIF in a digital command signal (DCS) and uses the $69^{th}$ bit of the FIF in the DCS signal to instruct the receiving machine to perform full-color mode communication.

In this conventional procedure, it is necessary for the transmitting machine to notify the receiving machine of the number of lines in a case where communication of a color image is executed in accordance with the JPEG standard. The method of giving notification of the number of lines includes communication procedures of two types, namely a first communication procedure in which zero lines is reported as the number of lines by JPEG-image-related information (JPEG information) transmitted before the JPEG image and notification of the number of lines actually transmitted is given using a JPEG marker DNL, and a second communication procedure in which notification of the number of lines is given by JPEG information at the start.

Further, facsimile transmission schemes are of two types, namely a scheme in which a scanned image is stored in memory temporarily and a so-called direct transmission scheme in which an image is transmitted while it is being scanned. In the case of direct transmission, the number of lines is reported to the receiving machine through the first communication procedure because the number of lines cannot be reported before image transmission.

However, in a case where transmission of a color image is performed through the first communication procedure, in which notification of zero lines is initially given by the JPEG information and notification of the number of lines actually transmitted is given by the JPEG marker DNL, there are instances where a communication error occurs in the machine receiving the Ad communicated image. A communication error of this kind tends to occur especially in personal computers equipped with software having a facsimile send/receive function. Further, in a case where communication is performed through the first communication procedure, the color facsimile transmission is carried out upon reporting the number of lines by the same method even when the image is re-transmitted after the occurrence of the error. This means that once the above-mentioned error occurs, the problem cannot be resolved by re-transmission.

SUMMARY OF THE INVENTION

Accordingly, an object of the present invention is to provide an image communication apparatus and method of controlling the same in which even if a procedure for reporting the number of lines gives rise to an error in the receiving machine, the occurrence of the same error can be prevented when a message is re-transmitted to the receiving machine.

Another object of the present invention is to so arrange it that even when a communication error occurs on the receiving side owing to the first communication procedure through which the number of lines of an image is reported as zero lines before transmission of image information and the number of lines actually transmitted is reported by a JPEG marker DNL in color image communication of a JPEG image, the second communication procedure, which reports the number of lines of the image before the image information is transmitted, is adopted when the image information is re-transmitted, thereby making it possible to perform color facsimile communication in reliable fashion.

According to the present invention, the foregoing objects are attained by providing an image communication apparatus capable of communicating JPEG images by color facsimile transmission, comprising: transmitting means capable of transmitting a JPEG image through a first procedure, which is for reporting number of lines of the JPEG image as zero lines to a receiving destination before the JPEG image is transmitted and then subsequently transmitting the JPEG image; and re-transmitting means which, if a communication error occurred at the receiving destination in a case where an image was transmitted by the transmitting means in accordance with the first procedure, is for re-transmitting image information through a second procedure, which is for reporting the number of lines of the JPEG image to the receiving destination before the JPEG image is transmitted and then subsequently transmitting the JPEG image.

In a preferred embodiment, the apparatus further comprises input means for inputting image information in a raster format, and counting means for counting the number of lines of the image information input by the input means, wherein the re-transmitting means re-transmits the image information through the second procedure using the number of lines counted by the counting means.

In a preferred embodiment, the apparatus further comprises mode selection means for switching between a direct transmit mode, in which image reading and transmission are performed in parallel, and a memory transmit mode, in which all image information to be transmitted is stored in memory temporarily and then transmitted, wherein the transmitting means transmits an image through the first procedure in a case where the direct transmit mode has been selected by the mode selection means.

In a preferred embodiment, the transmitting means transmits an image through the second procedure in a case where the memory transmit mode has been selected by the mode selection means.

The present invention further provides an image communication apparatus capable of communicating a color image of a predetermined size by color facsimile transmission, comprising: notification means for notifying a receiving destination of number of lines of the color image; and control means for changing method of notification by the notification means.

In a preferred embodiment, the color image is an image that has been compressed in a JPEG format.

In a preferred embodiment, the control means changes the method of notification when redial transmission of an identical object is performed.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENT

Figure 1:
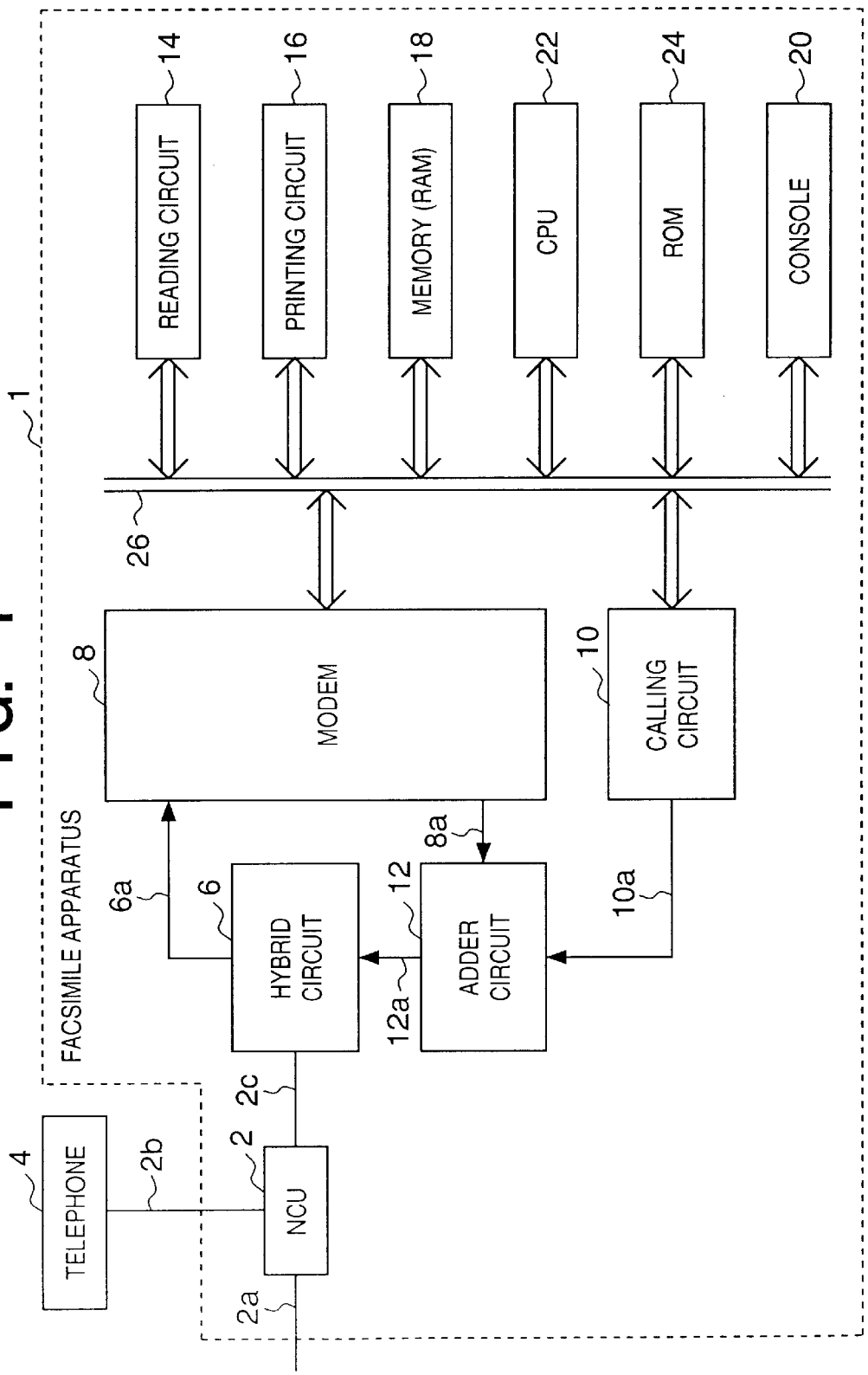
FIG. 1 is a block diagram illustrating a facsimile apparatus embodying the present invention.

The present invention will now be described in detail based upon the embodiment illustrated in the drawings.

FIG. 1 is a block diagram illustrating a facsimile apparatus 1 embodying the present invention.

The facsimile apparatus 1 includes an NCU (Network Control Unit) 2, which is connected to a telephone line 2a in order to use a telephone network in data communication or the like, for controlling the connection to a telephone switching network, changing over the data communication line and maintaining the loop. Further, under the control of a CPU 22 via a bus 26, the NCU 2 switches an internal CML (Connect Modem to Line) relay to connect the telephone line 2a to the side of a telephone 4 (CML off) or to the side of the facsimile apparatus (CML on). Under ordinary conditions, the telephone line 2a is connected to the side of the telephone 4.

A hybrid circuit 6 effects separation into transmission and reception signals, sends a transmission signal from an adder circuit 12 to the telephone line 2a via the NCU 2, accepts a signal from the side of the communicating party via the NCU 2 and sends this signal to a modem 8 via a signal line 6a.

The modem 8, which performs modulation and demodulation based upon ITU-T Recommendations V.8, V.21, V.27ter, V.29, V.17 and V.24, has its transmission mode designated in accordance with control exercised by the CPU 22. If a transmission signal enters from the bus 26, the modem 8 outputs demodulated data on a signal line 8a. If a reception signal being output on the signal line 6a enters the modem 8, the latter outputs demodulated data to the bus 26.

Telephone number information is input to an calling circuit 10 by a signal from the bus 26 and the calling circuit 10 outputs a DTMP selection signal to a signal line 10a.

Modulated data from the signal line 8a and the selection signal from the signal line 10a enter the adder circuit 12, which proceeds to add these inputs and output the sum to a signal line 12a.

A reading circuit 14 reads an image using a photoelectric transducer or the like and outputs data representing the read image to the bus 26.

A printing circuit 16, which has an ink-jet or electrophotographic print engine, successively prints, line by line, the information being output to the bus 26.

A memory circuit 18, which is constituted by a RAM, is used as a work area, stores the raw data of the read image or stores encoded information, and is further used to store received information or decoded information via the bus 26. When the identifier of a single-button dial key and the telephone number corresponding to this identifier, which are for dealing with single-button dialing, as well as JPEG-encoded image information have been transmitted, information as to whether an error occurred on the receiving side in a case where the number of lines was reported by the DNL is stored in the memory circuit 18. Single-button dialing is a function wherein a desired telephone number is stored in advance in association with a single-button dialing key and, when the key is pressed, the corresponding telephone number is dialed to effect facsimile communication.

A console 20 has operating keys and a display unit. Keys include single-button dialing keys for which corresponding telephone numbers have been stored; an abbreviated dialing key for calling telephone numbers stored in association with abbreviated dialing codes; numeric keys, * and # keys for entering telephone numbers and the like; a start key for starting facsimile transmission; a set key; a color communication selection key for specifying either color image or monochrome image; a direction transmission selection key for specifying designating a direct transmit mode, in which an image is transmitted from the source where the image is read; a single-button dialing registration key for registering a telephone number in regard to a single-button dialing key; and other function buttons. Information representing the key pressed is output to the bus 26 and read in by the CPU 22. It should be noted that in response to being pressed, the direct transmission selection key switches between the direct transmit mode and a memory transmit mode, in which all image information to be transmitted is stored in memory temporarily and then transmitted.

The CPU 22 implements overall control of the facsimile apparatus and executes a facsimile transmission control procedure. The control program for this is stored in a ROM 24.

The facsimile apparatus 1 is capable of color facsimile communication in which a color image is encoded in accordance with the JPEG standard. If a JPEG image is transmitted, the number of lines of the image is reported to the receiving machine. There are two procedures available for achieving this, namely first and second communication procedures. In the first communication method, zero lines is reported as the number of lines by JPEG information transmitted before the JPEG image, and notification of the number of lines actually transmitted is given using a JPEG marker DNL. In the second communication procedure, notification of the number of transmitted lines is given by the JPEG information.

In a case where a single-button dialing key is pressed and the facsimile apparatus 1 transmits a color image to the destination corresponding to this key upon encoding the image in accordance with the JPEG standard, the facsimile apparatus 1 reports the number of lines through the first communication procedure, performs monitoring to determine whether, as a result of this facsimile communication, a communication error occurred in the apparatus at the receiving destination owing to the fact that zero lines were specified, and registers the result of such monitoring in association with the single-button dialing key.

Further, if, in a case where facsimile transmission of a JPEG image is performed in response to pressing of a single-button dialing key, the prevailing mode is the so-called direct transmit mode in which the read image is not stored in memory, the facsimile apparatus 1 checks to determine whether the fact that a communication error occurred in communication through the first communication procedure has been registered in association with this single-button dialing key. If an error did not occur, then the number of lines is reported and color facsimile communication is executed through the first communication procedure. If an error occurs in this communication, the fact is stored in association with the destination of single-button dialing.

Furthermore, in communication effected by redialing this destination, the number of lines is reported by JPEG information and color communication is executed in accordance with the second communication procedure.

If, on the other hand, the fact that a communication error occurred has been registered in association with the single-button dialing key, then, even if the direct transmit mode has been designated, the designation is ignored, the read image is stored in memory temporarily, the number of lines is counted and then the number of lines is reported to the receiving destination and color facsimile communication is executed through the second communication procedure.

If the memory transmit mode in which the read image is stored temporarily has been selected when color facsimile communication is carried out, then the number of lines is counted and the number of lines is reported at the start through the second communication procedure to execute facsimile communication.

Figure 2:
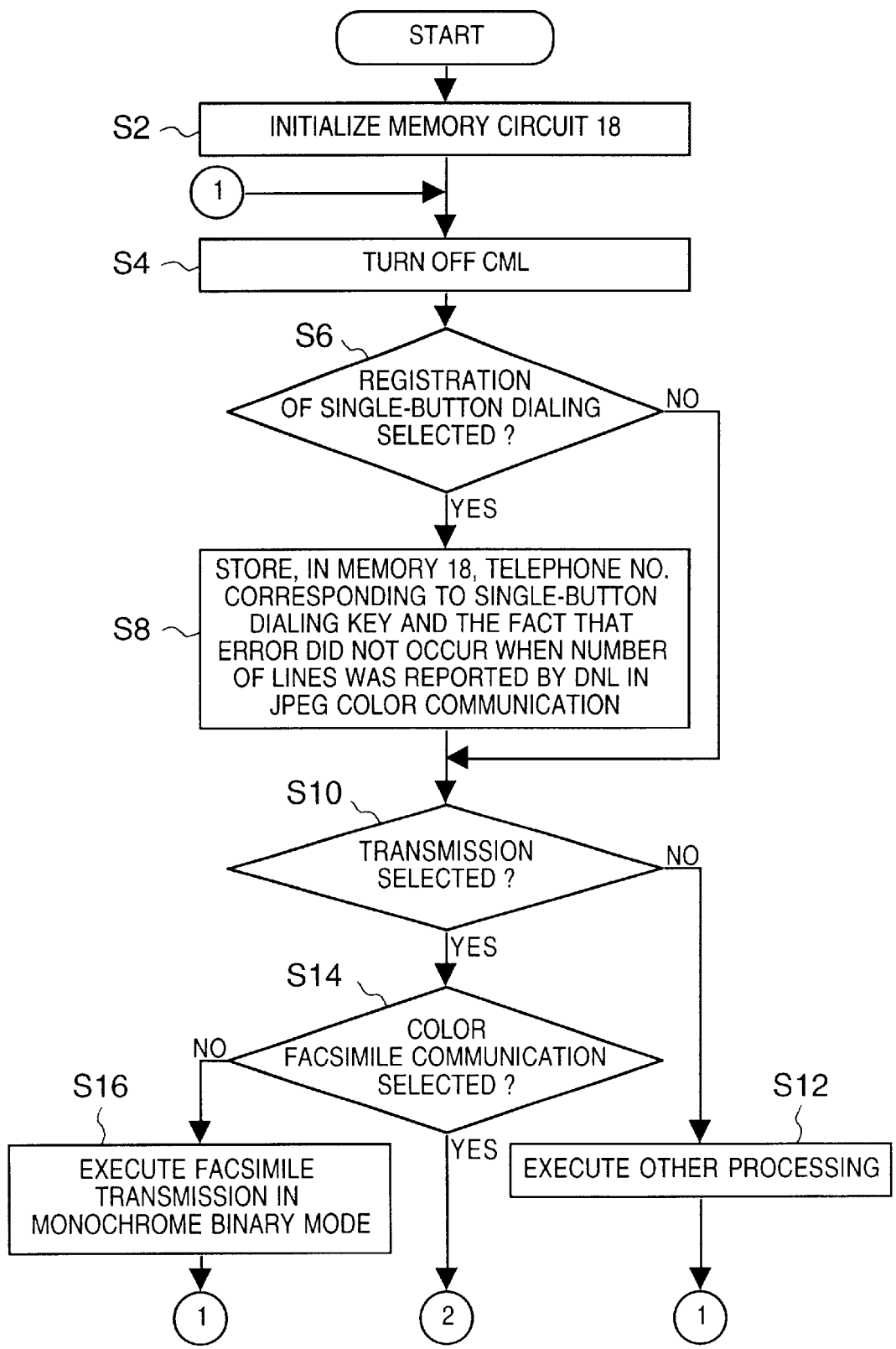
FIG. 2 is a flowchart of control in the apparatus of FIG. 1.
Figure 3:
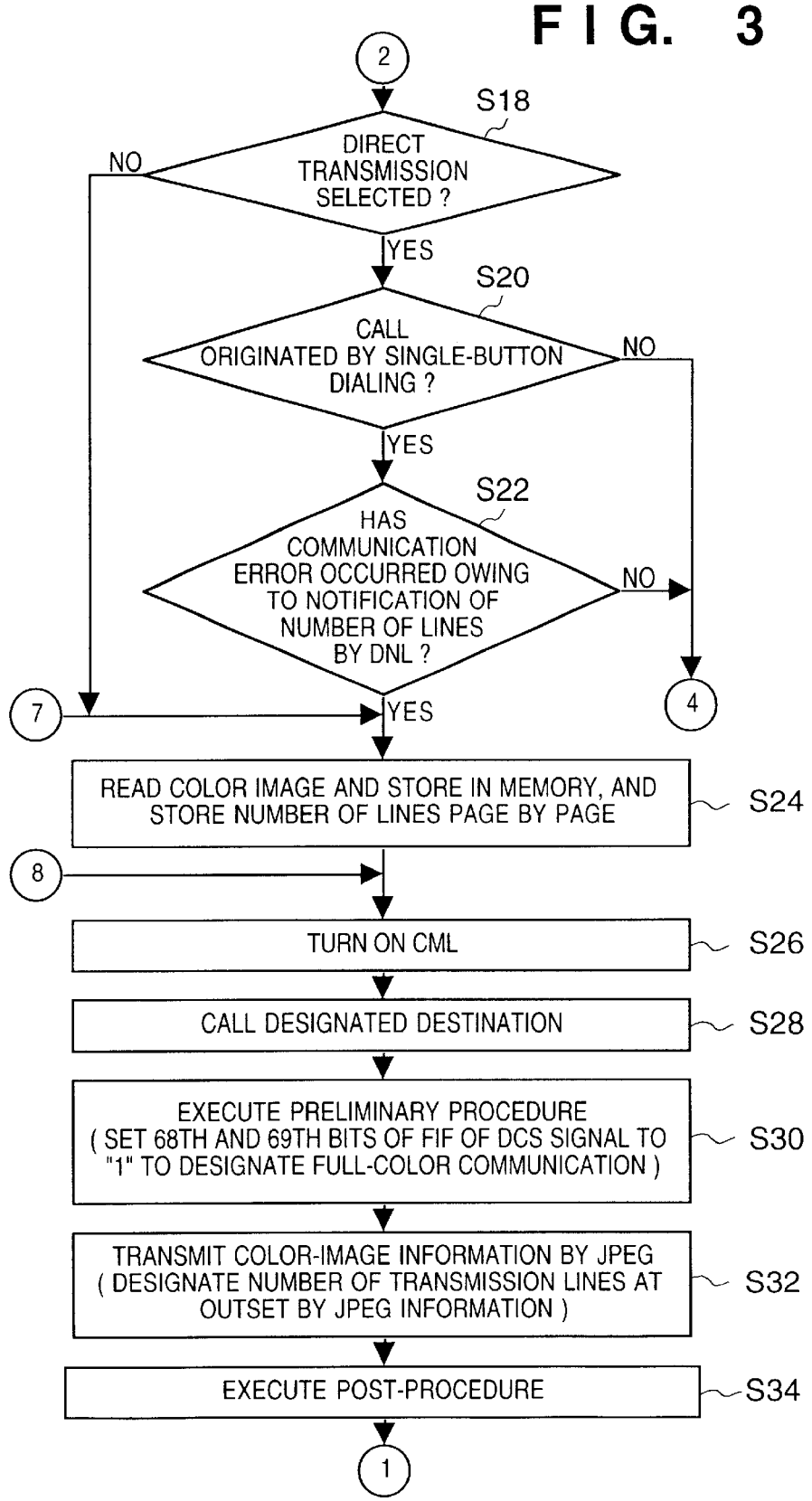
FIG. 3 is a flowchart of control in the apparatus of FIG. 1.
Figure 4:
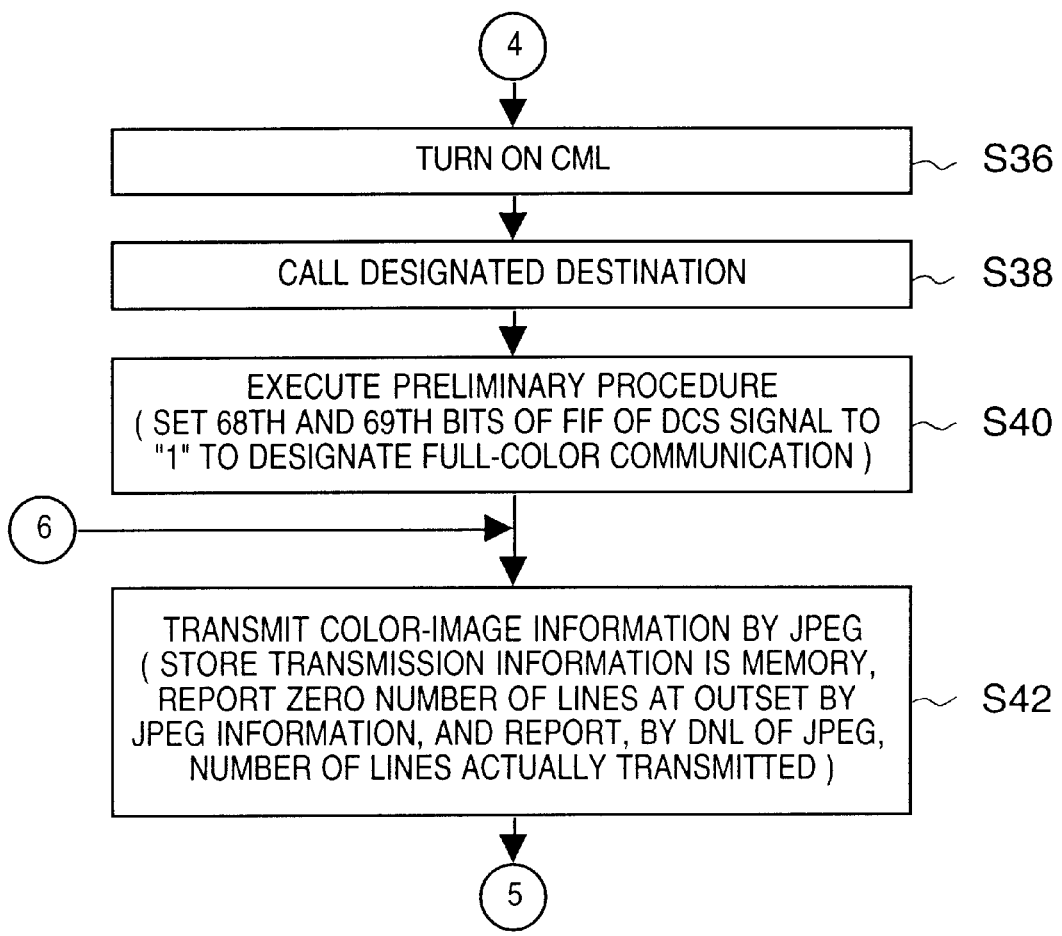
FIG. 4 is a flowchart of control in the apparatus of FIG. 1.
Figure 5:
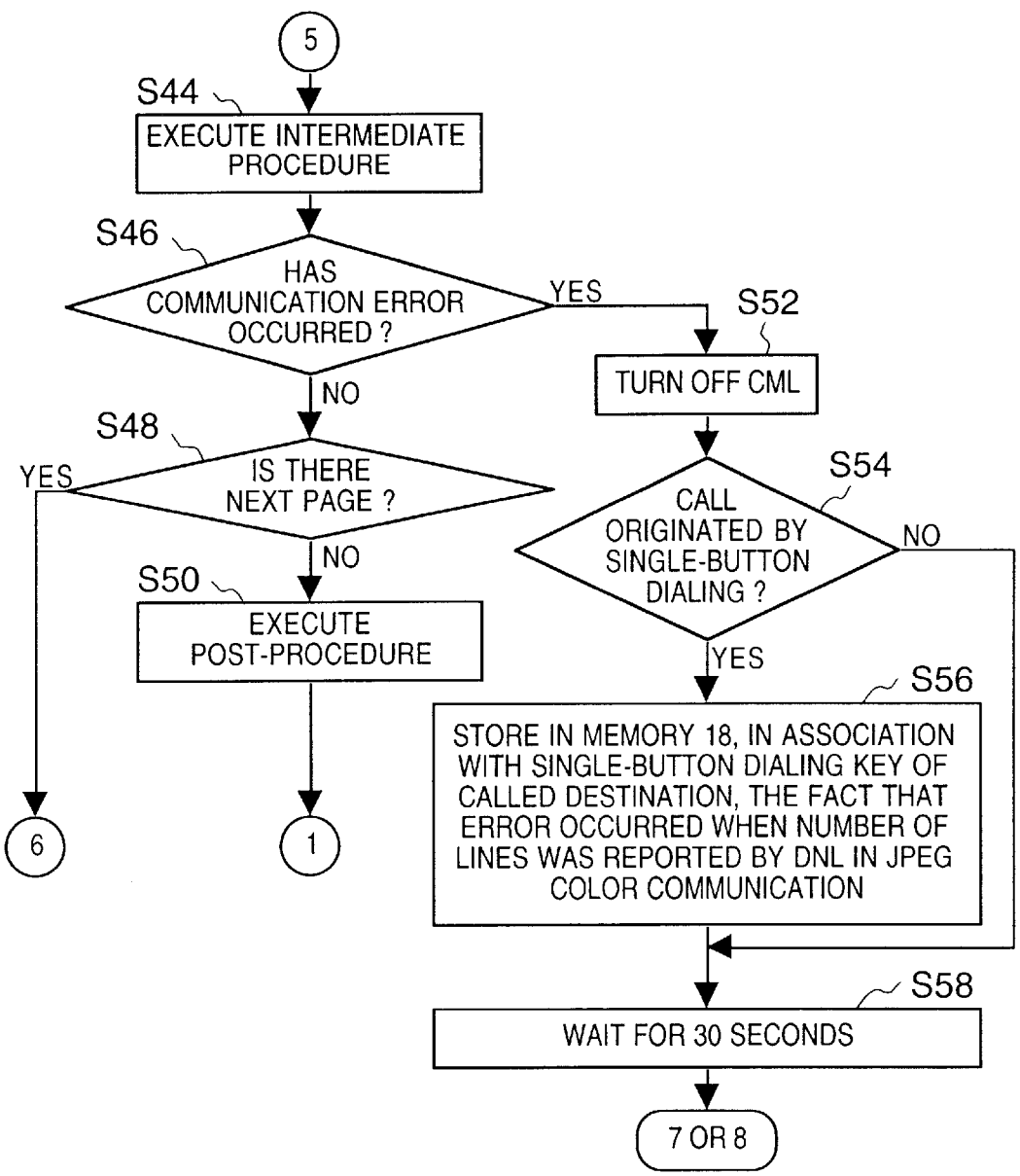
FIG. 5 is a flowchart of control in the apparatus of FIG. 1.

FIGS. 2, 3, 4 and 5 are flowcharts illustrating control in accordance with a program run by the CPU 22 of FIG. 1 in order to execute the control procedure described above. The processing of FIG. 2 is executed in response to any operation performed by the operator.

Step S2 in FIG. 2 calls for the memory circuit 18 to be initialized via the bus 26.

This is followed by step S4, at which the CML of the NCU 2 is turned off via the bus 26. In other words, the telephone line is switched over to the telephone side.

Next, at step S6, information is entered from the console 20 via the bus 26, it is determined whether registration for single-button dialing has been selected and, if registration has been selected, control proceeds to step S8. Here the telephone number corresponding to the pressed single-button dialing key is stored and the initial value of the communication error status corresponding to this single-button dialing key is set to "NO ERROR". When the number of lines has been reported by the DNL (i.e., when the first communication procedure has been adopted) at the time of color facsimile communication of a JPEG image, the communication error status indicates the absence or presence of an error at the receiving destination due to this communication method. These items of information are stored in the memory 18.

If it is found at step S6 that a single-button dialing key was not selected, control proceeds to step S10.

It is determined at step S10 whether facsimile communication has been selected. Control proceeds to step S14 if the answer is "YES" or to step S12, where other processing is executed, if the answer is "NO".

Information is entered from the console 20 via the bus 26 and it is determined at step S14 whether color facsimile communication has been selected. Control proceeds to step S18 (FIG. 3) if the answer is "YES" or to step S16, where facsimile transmission in the monochrome binary mode is executed, if the answer is "NO".

Information is entered from the console 20 via the bus 26 and it is determined at step S18 whether direct transmission has been selected. Control proceeds to step S20 if the answer is "YES" or to step S24, namely to memory transmission, if the answer is "NO".

Information is entered from the console 20 via the bus 26 and it is determined at step S20 whether origination of the call was by single-button redialing. Control proceeds to step S22 if the answer is "YES" or to step S36 if the answer is "NO".

Next, at step S22, information relating to the pressed single-button dialing key is entered from the memory 18 via the bus 26 and it is determined whether the fact that a communication error occurred through notification of the number of lines by the DNL, namely through the first communication procedure, has been registered in association with the pressed single-button dialing key. If occurrence of a communication error has been registered, control proceeds to step S24; otherwise, control proceeds to step S36. The number of lines is reported to the receiving destination using the second communication procedure from step S24 onward.

A color image is read and stored in memory at step S24. Here the number of lines is counted page by page.

The CML of the NCU 2 is turned on via the bus 26 at step S26. In other words, the telephone line is connected to the facsimile apparatus.

This is followed by step S28, at which the call is placed to the designated destination via the bus 26 using the calling circuit 10.

Step 30 represents a preliminary procedure. Here the $68^{th}$ and $69^{th}$ bits of the FIF of the DCS signal are both made "1" to specify JPEG full-color communication.

The color image data is encoded in accordance with the JPEG standard and transmitted at step S32. Here the number of lines per page counted at step S24 is specified by JPEG information from the start as the number of transmitted lines.

Step 34 represents a post-procedure.

If it is determined at step S20 or S22 that the origination of the call was not by single-button dialing or that the origination of the call was by single-button dialing but that an error occurred in the first communication procedure, then control branches to step S36. Facsimile transmission using the first communication procedure is performed from step S36 onward.

The CML of the NCU 2 is turned on via the bus 26 at step S36.

This is followed by step S38, at which the call is placed to the designated destination via the bus 26 using the originating circuit 10.

Step S40 represents the preliminary procedure. Here the $68^{th}$ and $69^{th}$ bits of the FIF of the DCS signal are both made "1" to specify JPEG full-color communication.

Next, at step S42, a color image is read and, in concurrence therewith, the read color-image information is encoded in accordance with the JPEG standard and is transmitted. At this time the number of lines is counted page by page. Further, the image information transmitted is stored in memory. The number of lines is initially reported as zero lines by the JPEG information and the number of lines actually transmitted is reported by the JPEG marker DNL.

Step S44 represents an intermediate procedure.

It is determined at step S46 whether a communication error occurred owing to the first communication procedure. Control proceeds to step S52 if the answer is "YES" or to step S48 if the answer is "NO".

Whether there is a next page is determined at step S48. Control proceeds to step S42 if the answer is "YES" or to step S50, where the post-procedure is executed, if the answer is "NO".

The CML of the NCU 2 is turned off via the bus 26 at step S52.

It is determined at step S54 whether origination of the call was by single-button redialing. Control proceeds to step S56 if the answer is "YES". Here the fact that a communication error occurred in the first communication procedure, namely in a case where the number of lines was reported by the DNL at the time of JPEG color communication, is registered via the bus 26 in association with the single-button dialing key that was pressed for facsimile transmission.

If it is determined at step S54 that the call was not originated by pressing a single-button dialing key, control proceeds to step S58, at which control returns to step S24 upon elapse of a waiting period of 30 seconds. Though the image is read again at step S24, it is also possible for the image information stored in the memory to be re-transmitted at step S42. In such case control would return to step S26 and re-transmission of the image information stored in the memory beforehand would be performed at step S32 in the memory transmit mode in accordance with the second communication procedure.

By thus re-transmitting image information through the second communication procedure to a receiving destination where an error occurred owing to the first communication procedure, reoccurrence of the same error can be prevented.

Further, in a case where a receiving destination for which a single-button dialing key has been set develops an error owing to the first communication procedure, an indication of this fact is registered in correspondence with this single-button dialing key. When a facsimile transmission is performed by pressing the single-button dialing key, reference is made to the stored error record. When it is determined that an error occurred with the first communication procedure, the facsimile transmission is carried out in the memory transmit mode using the second communication procedure even if the direct transmit mode is designated by a user. Adopting this expedient makes it possible to prevent the occurrence of error due to the first communication procedure.

In this embodiment, the arrangement is such that information representing a communication error is stored in regard to a single-button dialing key. However, communication-error information can be stored in similar fashion with regard to an abbreviated-dialing key and the first and second communication procedures can be switched between in dependence upon the error information. More specifically, rather than merely storing an abbreviated-dialing code and the corresponding telephone number, whether or not a communication error occurred on the receiving side when a JPEG image was transmitted to the destination in the direct transmit mode would be stored in association with the abbreviated-dialing code. When facsimile transmission of a JPEG image is performed by abbreviated dialing, reference is had to the indication, which has been stored in association with the abbreviated-dialing code, as to whether or not a communication error occurred. When it is found that an error occurred, then the image information is transmitted through the first communication procedure even if the direct transmit mode is in effect.

(Other Embodiment)

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the object of the invention is attained also by supplying, to a system or apparatus, a storage medium (or recording medium) storing the program codes of the software of the procedure shown in FIGS. 2 to 5 for implementing the functions of the foregoing embodiment, reading the program codes with a computer (e.g., a CPU or MPU) of the system or apparatus from the storage medium, and then executing the program codes.

In this case, the program codes read from the storage medium implement the novel functions of the embodiment and the storage medium storing the program codes constitutes the invention.

Furthermore, besides the case where the aforesaid functions according to the embodiment are implemented by executing the program codes read by a computer, it goes without saying that the present invention covers a case where an operating system or the like running on the computer performs a part of or the entire process in accordance with the designation of program codes and implements the functions according to the embodiment.

It goes without saying that the present invention further covers a case where, after the program codes read from the storage medium are written in a function expansion card inserted into the computer or in a memory provided in a function expansion unit connected to the computer, a CPU or the like contained in the function expansion card or function expansion unit performs a part of or the entire process in accordance with the designation of program codes and implements the function of the above embodiment.

Thus, in accordance with the present invention, as described above, even if a procedure for reporting the number of lines gives rise to an error in the receiving machine, the occurrence of the same error can be prevented when a message is re-transmitted to the receiving machine.

For example, when a communication error occurs on the receiving side owing to the first communication procedure through which the number of lines of an image is reported as zero lines before transmission of image information and the number of lines actually transmitted is reported by a JPEG marker DNL in color image communication of a JPEG image, the second communication procedure, which reports the number of lines of the image before the image information is transmitted, is adopted when the image information is re-transmitted, thereby making it possible to perform color facsimile communication in reliable fashion.

Further, indications of communicating parties where a communication error occurred owing to the first communication procedure are stored in association with single-button dialing keys. When color image communication of a JPEG image is performed with regard to any of these communicating parties, the second communication procedure is adopted to thereby prevent occurrence of the communication error.

As many apparently widely different embodiments of the present invention can be made without departing from the spirit and scope thereof, it is to be understood that the invention is not limited to the specific embodiments thereof except as defined in the appended claims.

What is claimed is:

1. An image communication apparatus that communicates JPEG images by color-facsimile transmission, comprising:

transmission means for transmitting a JPEG image through a first procedure, which is for reporting a number of lines of the JPEG image as zero lines to a receiving destination before the JPEG image is transmitted and then subsequently transmitting the JPEG image;

re-transmission means for, if a communication error occurs at the receiving destination in a case in which image data was transmitted by said transmission means in accordance with the first procedure, re-transmitting the image data through a second procedure, which is for reporting the number of lines of the JPEG image to the receiving destination before the JPEG image is transmitted and then subsequently transmitting the JPEG image;

a memory for storing a key or code in correspondence with a transmission destination and a result of communication, which has been executed through the first procedure, in correspondence with the transmission destination; and abbreviated-dialing designation means for designating a transmission destination based upon a designated key or code and the transmission designation stored in said memory, wherein, in a case in which the transmission destination has been designated by said abbreviated-dialing designating means, said transmission means refers to the stored result of communication corresponding to this transmission destination, transmits the image data through the second procedure if an indication of an occurrence of a communication error has been stored, and, in a case in which a communication error occurs in this transmission, stores an indication of this error in correspondence with the transmission destination.

2. A method of controlling an image communication apparatus that communicates JPEG images by color-facsimile transmission, comprising;

a transmission step of transmitting a JPEG image through a first procedure, which is for reporting a number of lines of the JPEG image as zero lines to a receiving destination before the JPEG image is transmitted and then subsequently transmitting the JPEG image; and a re-transmission step of, if a communication error occurs at the receiving destination in a case in which image data was transmitted in said transmission step in accordance with the first procedure, re-transmitting the image data through a second procedure, which is for reporting the number of lines of the JPEG image to the receiving destination before the JPEG image is transmitted and then subsequently transmitting the JPEG image, wherein, in a case in which a transmission destination has been designated by referring to a memory, which stores a key or code in correspondence with the transmission destination and a result of communication, which has been executed through the first procedure, in correspondence with the transmission destination, said transmission step refers to the stored result of communication corresponding to this transmission destination, transmits the image data through the second procedure if an indication of an occurrence of a communication error has been stored, and, in a case in which a communication error occurs in this transmission, stores an indication of this error in correspondence with the transmission destination.

3. An image communication apparatus that communicates a color image of a predetermined size by color-facsimile transmission, comprising:

notification means for notifying a receiving destination of a number of lines of the color image; and control means for changing a notification mode used by said notification means.

4. The apparatus according to claim 3, wherein the color image is an image that has been compressed in a JPEG format.

5. The apparatus according to claim 3, wherein said control means changes the notification mode when redial transmission of an identical object is performed.

6. An image communication method for communicating a color image of a predetermined size by color-facsimile transmission, comprising:

a notification step of notifying a receiving destination of a number of lines of the color image; and a control step of changing a notification mode used in said notification step.

7. A computer-readable storage medium on which a computer program is encoded, the computer program comprising:

notification code means for notifying a receiving destination of a number of lines of the color image; and control code means for changing a notification mode used by said notification code means.

8. An image communication apparatus for color-facsimile transmission of a JPEG color image, comprising:

a reader, which reads a color image;

a transmitter, which transmits the color image in a direct transmission mode, in which the color image is transmitted in parallel with reading of the color image by said reader, or in a memory transmission mode, in which the color image read by said reader is stored in a memory and the stored color image is read from the memory and transmitted; and a selector, which selects one of a first notification mode and a second notification mode for notifying a receiving party of a number of lines, wherein, when said transmitter attempts to re-transmit the color image after an error occurrence during transmission of the color image in the direct transmission mode, the color image is re-transmitted in the memory transmission mode and said selector selects a notification mode different from the notification mode used with the direct transmission mode.

9. An apparatus according to claim 8, further comprising:

a first memory, which stores error information in correspondence with information relevant to the receiving party when an error occurs during a transmission of the color image by said transmitter in the direct transmission mode; and a second memory, which stores the information relevant to the receiving party of a re-transmission, wherein, in a case in which the information relevant to the receiving party of the re-transmission is stored in said second memory and error information relevant to the receiving party of the transmission is stored in said first memory, said selector selects a notification mode different from a notification mode used with the direct transmission mode.

10. The apparatus according to claim 8, wherein the first notification mode is a mode in which a number of lines is notified with a DNL marker of a JPEG file for the direct transmission mode, and wherein the second notification mode is a mode in which the number of lines is notified with a header of a JPEG file for the memory transmission mode.

* * * * *